UNITED STATES PATENT OFFICE 2,267,200

COMPOSITION FOR PREVENTING SUNBURN

Arthur B. Hersberger, Lansdowne, and Henry C. Cowles, Jr., Philadelphia, Pa., assignors to The Atlantic Refining Company, Philadelphia, Pa., a corporation of Pennsylvania No Drawing. Application January 5, 1940, Serial No. 312,514

2 Claims. (Cl. 167—90)

The present invention relates to compositions for preventing sunburn, and more particularly to compositions comprising a vehicle having incorporated therein a small quantity of a resin or resinous material capable of absorbing light of wave lengths normally causing sunburn, i. e., wave lengths of the order of 4500 A. to 2000 A., and particularly wave lengths of 3300 A. to 2600 A.

We have found that highly effective compositions for preventing or reducing sunburn may be produced by dispersing in a suitable vehicle, a small quantity of a resin, i. e., of the order of 0.25% to about 2.0% by weight, which resin is characterized by its ability to transmit visible light down to wave lengths of about 4500 A., and to absorb light of wave lengths 4500 A. to about 2000 A., and to emit the latter in the form of harmless radiations. Preferably the resins to be employed in accordance with our invention are readily soluble or dispersable in the vehicle utilized, and are sufficiently light in color as to produce compositions of acceptable appearance and stability towards light.

In preparing our composition we may use as a vehicle any suitable emollient such as stearic acid base finishing or vanishing creams, cocoa butter, lanoline, petrolatum, mineral oil, vegetable oils such as olive oil, palm oil, or cocoanut oil, and various other oleaginous materials. Among the resins or resinous materials which may be suitably employed are resins isolated from cracked or uncracked petroleum distillates, residuums, tars, pitches, and asphalts by means of solvent and/or adsorbent treatments; synthetic resinous materials produced by the catalytic or thermal polymerization of constituents of hydrocarbon oils or gases; resins produced by condensation reactions of phenolic compounds with aldehydes, amines, and other reactive compounds; and naturally occurring resins having the proper light-absorption properties.

Our sunburn protective compositions may be prepared by simply adding the resin to the vehicle in the desired proportions and agitating or mixing the ingredients until a homogeneous composition is obtained. In some cases the application of heat may be desirable or necessary in order to assist solution or dispersion of the resin in the vehicle.

Our invention may be further illustrated by the following examples, which, however, are not intended as limiting the scope thereof. The resinous materials employed were isolated from petroleum tars and asphalts by treating 1 volume of the raw material with 20 volumes of 88° A. P. I. petroleum naphtha to precipitate the asphaltenes. The asphaltenes were separated from the naphtha solution of oil and resins, and the solution was filtered through a bed of 30/60 mesh fuller's earth, the resins being adsorbed from the solution, and the oil and naphtha filtering through. The fuller's earth bed was then washed with additional 88° naphtha in order to remove residual oil, and the resins were then extracted from the washed earth by means of benzol. The benzol solution of resins was then evaporated to remove the benzol, and there was obtained as a residue, a solid, brittle resin varying in color from yellow to orange-red. The resin was then incorporated in desired quantity in a suitable vehicle, such as a stearic acid base vanishing cream, and the resulting composition was applied in thin films to skin, which was then exposed to ultra-violet light to determine the effectiveness of the composition in preventing burning of the skin.

| Composition | Weight per cent resin | Fluorescence in U-V light | Color stability | Protection against U-V light | Color of composition |
|---|---|---|---|---|---|
| Vanishing cream base | 0 | None | Stable | None | White. |
| Base+resin from pressure still cracked tar | 0.1 | Orange-yellow | do | Fair | Do. |
| Do | 0.25 | do | do | Good | Cream. |
| Do | 1.0 | do | do | Excellent | Do. |
| Do | 2.5 | do | do | do | Straw. |
| Base+resin from de Florez cracked tar | 1.0 | Yellow | Slight darkening | do | Do. |
| Base+resin from Venezuela 12 flux asphalt | 1.0 | Greenish-yellow | Stable | do | Cream. |
| Base+resin from Santa Maria 12 flux asphalt | 1.0 | Bluish-white | do | Good | Do. |
| Base+resin from Lea-Ward 12 flux asphalt | 1.0 | Orange-yellow | do | Excellent | Straw. |

From the above examples it will be seen that compositions prepared in accordance with our invention afford effective protection against radiations normally tending to produce sunburn. The resins employed in the examples above given are high molecular weight complex hydrocarbons or hydrocarbon mixtures which are sufficiently soluble or dispersible in the base vehicle to form homogeneous compositions which are readily applicable, stable and unharmful to the skin. In lieu of the resins derived from cracked tars or asphalts, other resins of the nature of those hereinbefore described may be suitably employed.

What we claim is:

1. A composition for preventing sunburn, which comprises a vehicle having dispersed therein a small quantity of a resin derived from petroleum and capable of absorbing light of wave lengths normally tending to produce sunburn.

2. A composition for preventing sunburn, which comprises a vehicle having dispersed therein from about 0.25% to about 2.0% of a resin derived from petroleum and capable of absorbing light of wave lengths normally tending to produce sunburn.

ARTHUR B. HERSBERGER.
HENRY C. COWLES, JR.